United States Patent
Song et al.

(10) Patent No.: US 7,940,783 B2
(45) Date of Patent: May 10, 2011

(54) METHOD AND TERMINAL FOR RESTRICTION OF DOMAIN TRANSFER

(75) Inventors: Jae-Seung Song, Seoul (KR);
Kyung-Ae Yoon, Gyeonggi-Do (KR);
Mi-Seon Ra, Seoul (KR); Hyun-Sook Kim, Seoul (KR); Hede Patrice, Enghien-les-bains (FR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/562,971

(22) Filed: Sep. 18, 2009

(65) Prior Publication Data

US 2010/0020768 A1    Jan. 28, 2010

Related U.S. Application Data

(63) Continuation of application No. 11/702,161, filed on Feb. 5, 2007, now Pat. No. 7,606,247.

(60) Provisional application No. 60/765,211, filed on Feb. 6, 2006.

(30) Foreign Application Priority Data

Nov. 17, 2006  (KR) .................. 10-2006-0114136
Dec. 28, 2006  (KR) .................. 10-2006-0137127

(51) Int. Cl.
*H04L 12/28* (2006.01)

(52) U.S. Cl. .................. 370/401; 370/351; 455/445

(58) Field of Classification Search .................. None
See application file for complete search history.

(56) References Cited

U.S. PATENT DOCUMENTS

| | | | |
|---|---|---|---|
| 5,210,874 A | 5/1993 | Karger | |
| 6,954,654 B2 | 10/2005 | Ejzak | |
| 2001/0026553 A1* | 10/2001 | Gallant et al. | 370/395 |
| 2007/0049281 A1* | 3/2007 | Chen et al. | 455/445 |
| 2007/0110075 A1 | 5/2007 | Olvera-Hernandez | |
| 2007/0135146 A1* | 6/2007 | Rezaiifar et al. | 455/466 |
| 2007/0149166 A1* | 6/2007 | Turcotte et al. | 455/404.1 |
| 2007/0238467 A1* | 10/2007 | Buckley et al. | 455/445 |
| 2007/0238468 A1 | 10/2007 | Buckley et al. | |
| 2007/0254625 A1 | 11/2007 | Edge | |
| 2008/0318565 A1* | 12/2008 | Stojanovski et al. | 455/422.1 |
| 2010/0034166 A1* | 2/2010 | Olvera-Hernandez | 370/331 |

FOREIGN PATENT DOCUMENTS

| | | |
|---|---|---|
| JP | 2000-209633 A | 7/2000 |
| JP | 2004-502388 A | 1/2004 |
| JP | 2005-295232 A | 10/2005 |
| KR | 2002-0089846 A | 11/2002 |
| WO | WO 2004/059856 A1 | 7/2004 |

\* cited by examiner

*Primary Examiner* — Phirin Sam
(74) *Attorney, Agent, or Firm* — Birch, Stewart, Kolasch & Birch, LLP

(57) ABSTRACT

A method and mobile terminal for controlling a voice call continuity (VCC) operation, are provided. According to an embodiment, the invention is directed to a method for controlling a voice call continuity (VCC) operation between a mobile terminal and a network, the method comprising: receiving operator policy via an OMA Device Management (DM) method during at least one call or session established between the mobile terminal and the network, the operator policy including domain transfer restriction information; evaluating the domain transfer restriction information of the operator policy; and selectively initiating a domain transfer according to the evaluated domain transfer restriction information of the operator policy, wherein the domain transfer restriction information indicates that a domain transfer from CS domain to IMS domain is restricted or not or a domain transfer from IMS domain to CS domain is restricted or not.

10 Claims, 4 Drawing Sheets

METHOD AND TERMINAL FOR RESTRICTION OF DOMAIN TRANSFER

The present application is a Continuation Application of U.S. application Ser. No. 11/702,161 filed Feb. 5, 2007 now U.S. Pat. No. 7,606,247 which claims the priority benefits of U.S. Provisional Application No. 60/765,211 filed on Feb. 6, 2006 and Korean Patent Applications Nos. 10-2006-0114136 and 10-2006-0137127 respectively filed on Nov. 17, 2006 and Dec. 28, 2006 in Republic of Korea. The entire contents of all these applications are herein fully incorporated by reference.

BACKGROUND OF THE INVENTION

1. Field of the Invention

The present invention relates to a Voice Call Continuity (VCC), and more particularly, to restricting a domain transfer in a VCC.

2. Discussion of the Background Art

In general, a Voice Call Continuity (VCC) refers to a type of application, namely, a home IMS (IP Multimedia System) application which is capable of transporting voice calls between a CS (Circuit Switching) domain and an IMS domain. The VCC provides functions of voice call originations, voice call terminations, a domain selection and a domain transfer from the CS domain to the IMS domain or vice versa. Here, the domain transfer refers to transferring access legs for voice calls toward a user equipment (UE) (i.e., a terminal) from the CS domain to the IMS domain or vice versa during an active session. The access leg denotes a call control leg between a VCC UE and a Domain Transfer Function (DTF) of an VCC application (server).

Through the domain transfer procedures, continuity for one or more voice calls/sessions is provided between the IMS domain and the CS domain while the VCC UE performs the one or more voice calls/sessions.

Generally, a domain transfer for a certain voice call/session from the CS domain to the IMS domain or vice versa is initiated only when a DTF is positioned on a signal path of the voice call/session setup. For this, positioning of the DTF on the way of the signal path of the voice call/session setup is referred to as anchoring in IMS or anchoring.

FIG. 1 illustrates a general architecture of a network for providing a VCC service.

As illustrated in FIG. 1, a VCC UE 10 denotes all types of terminals which support the VCC service. The VCC UE can access CS and PS (packet switching) domains. That is, when accessing the CS domain, the VCC UE uses a UE-CS (not shown) provided therein, whereas the VCC UE uses a UE-IMS (not shown) provided therein when accessing the PS domain.

A VCC application 30 is an application server for providing the VCC service, and is constituted with entities which perform a series of functions. The series of functions may include functions required to setup voice calls toward the VCC UE, and functions required to switch an access leg of the VCC UE between the CS domain and the IMS domain with maintaining an active session. For instance, the series of functions can be a Domain Transfer Function 30a, a Domain Selection Function 30d, a CS Adaptation Function 30b, and a CAMEL Service Application 30c. Detailed capabilities and operations for these series of functions are described in 3GPP TS 23.206 V1.2.0.

Generally, the CS domain entities include a Visited Mobile Switching Center (VMSC), a Gateway MSC (GMSC), a gsm-SCF, and the like. The IMS domain entities include a P-CSCF, a S-CSCF, a I-CSCF and a Media Gateway Control Function (MGCF).

FIG. 2 is a signal flowchart among each component of a network (e.g., the network shown in FIG. 1) in a case where a domain transfer occurs between the IMS domain and CS domain. Hereinafter, domain transfer procedures in a VCC service according to a background art will be explained with reference to FIG. 2.

As shown in FIG. 2, it is just a VCC UE which initiates a domain transfer in a VCC. That is, the VCC UE establishes a voice call (or session) over the CS domain or IMS domain with a network and then may decide whether or not to initiate a domain transfers by moving (or transferring) from one domain to another domain. By doing this, the established voice call (so-called "ongoing call") may continue on the way of handing over (i.e., domain transfer) from the CS domain to the IMS domain or vice verse. Here, for initiating (performing) a domain transfer for the voice call from one domain (e.g., IMS domain) to another domain (e.g., CS domain), the VCC UE may initiate the domain transfer based on previously-stored information. Here, the information previously stored in the VCC UE may include radio conditions of a CS network to access, operator policy, user preferences, and the like.

Procedures (1)~(4) of initiating, by the VCC UE, a domain transfer from a CS domain to an IMS domain according to the background art are as follows:

(1) The VCC UE may decide to initiate a domain transfer for a voice call which has originated and is ongoing toward the CS domain, namely, an outgoing call.

(2) When the VCC UE sends an INVITE message to a VCC application, a Domain Transfer Function (DTF) in the VCC application establishes an IMS session leg for the voice call over the IMS domain.

(3) After the IMS session leg is established between the DTF and the IMS domain, the DTF routes the ongoing session to the IMS domain.

(4) After routing the ongoing session to the IMS domain, a CS session leg is released.

Thus, the domain transfer for the voice call is initiated from the CS domain to the IMS domain through the procedures of (1)~(4).

As aforementioned with respect to the domain transfer in the VCC, the domain transfer in the VCC is initiated by the VCC UE. However, it is the network that substantially handles the domain transfer initiated by the VCC UE. Also, the network may not perform the domain transfer requested by the VCC UE, but can restrict the domain transfer according to a specific state. For instance, a domain transfer at the network side may be generically or temporarily restricted based upon operator policy. The restriction of the domain transfer may include various operations made by the network, for example, an operation to ignore the request of the domain transfer initiated by the VCC UE, another operation to delay the domain transfer requested by the VCC UE, and the like.

However, the network of the VCC (e.g., VCC application) according to the background art does not have any function of informing the VCC UE of operator policy which is temporarily or generically changed. Although the operator policy (or a change therein) may cause the network to be in a state in which it restricts the domain transfer (and thus may not be able to perform the domain transfer), the VCC UE does not and can not recognize this state of the network in which the domain transfer is restricted because the network does not inform the UE of this restriction in the background art. Accordingly, since the VCC UE can not know that the domain transfer is restricted in the network, the VCC UE still attempts or initiates the domain transfer for ongoing calls. This results in the limitations and problems of wasting signaling, radio resources, battery life of the UE, CPU power of the VCC UE, and the like.

SUMMARY OF THE INVENTION

Therefore, it is an object of the present invention to provide a technique of sending by a network (e.g., VCC application) information related to a restriction of a domain transfer to a VCC UE, e.g., when a change in operator policy of the network causes a restriction of the domain transfer.

It is another object of the present invention to provide a UE (i.e., terminal) which analyzes information related to a restriction of a domain transfer sent from a network, and decides whether or not to initiate a domain transfer for a call which is currently ongoing by taking into account the analyzed domain transfer information.

It is another object of the present invention to provide a terminal, server, system and method for controlling VCC operations by communicating domain transfer restriction information, which address the limitations and disadvantages associated with the background art.

To achieve these and other objects, there is provided according to an aspect of the present invention a method for restricting a domain transfer comprising: receiving, by a terminal, domain transfer restriction information from a network server; analyzing the domain transfer restriction information by the terminal; and deciding, by the terminal, whether to initiate a domain transfer for a call by taking into account the analyzed domain transfer restriction information.

To achieve these and other objects, there is provided according to another aspect of the present invention a terminal comprising: a receiver for receiving domain transfer restriction information; a transmitter for transmitting a response (Ack) message with respect to the received domain transfer restriction information; and a VCC enabler for analyzing the domain transfer restriction information and deciding a domain transfer for a call by taking into account the analyzed domain transfer restriction information.

To achieve these and other objects, there is provided according to another aspect of the present invention a network server comprising: a message generator for generating a domain transfer restriction message including domain transfer restriction information so as to provide the terminal with the domain transfer restriction information; a transmitter for transmitting the generated domain transfer restriction message to the terminal; and a receiver for receiving a response message from the terminal with respect to the domain transfer restriction message.

According to another aspect, the present invention provides a method for controlling a voice call continuity (VCC) operation, comprising: receiving, by a terminal, a message from a network server, the message including domain transfer restriction information; checking, by the terminal, the domain transfer restriction information included in the received message; determining, by the terminal, whether or not to initiate a domain transfer based on at least the domain transfer restriction information; and selectively initiating, by the terminal, the domain transfer based on the determination result.

According to another aspect, the present invention provides a terminal for controlling a voice call continuity (VCC) operation, comprising: a receiver to receive a message from a network server, the message including domain transfer restriction information; and a controller to check the domain transfer restriction information included in the received message, to determine whether or not to initiate a domain transfer based on at least the domain transfer restriction information, and to selectively initiate the domain transfer based on the determination result.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE PREFERRED EMBODIMENTS

The present invention is applied to a VCC field of 3GPP, but may be applied to other communication fields.

Substantially in the present invention, first, when a domain transfer is restricted in a network (e.g., VCC application), e.g., due to a change in operator policy, a network notifies a UE (i.e., terminal) of information related to the domain transfer restriction. Second, the UE stores the information related to the domain transfer restriction, and, third, the UE analyzes or takes into account the information related to the domain transfer restriction when attempting the domain transfer for ongoing calls (i.e., outgoing calls), thus to decide whether to initiate the domain transfer for the ongoing calls (i.e., outgoing calls).

Hereinafter, terms preferably used in the present invention will be defined.

A UE according to the present invention may include all types of terminals which can be used for the VCC service. For instance, the UE according to the present invention comprehensively includes mobile communications terminals (e.g., UEs, mobile phones, cellular phones, DMB phones, DVB-H phones, PDAs, PTT, etc.), digital TV sets, GPS navigation devices, portable game machines, MP3, other home appliances, and the like.

User preferences denotes information or parameter for defining domain selection information which indicates what domain the UE user prefers to use for incoming or outgoing calls when the UE (or terminal) is available over both the CS domain and IMS domain.

Operator policy denotes information related to a network state or a network management. The operator policy may frequently be updated according to the network state or for the network management. The updated operator policy may include information for restricting a domain transfer for ongoing calls.

An ongoing call denotes a call in progress between a UE and a VCC application, which includes all of the incoming or outgoing calls.

A 'V3 interface' used in the present invention preferably denotes an interface for a mutual information transfer between a UE and a VCC application. For instance, the V3 interface is shown as 20 in FIG. 1 as an example. The V3 interface may be include a Ut interface, and an OMA DM (device management). That is, an information transfer from the UE to the VCC application can be achieved by use of the Ut interface, whereas an information transfer from the VCC application to the UE can be achieved by use of the DM using a DM method. As another example, the V3 interface method may include an unstructured supplementary service data (USSD) method. The Ut interface, the DM method and the USSD method are known in the art. A protocol of the V3 interface may exemplarily be a HTTP, which has a XML format.

Hereinafter, constructions and operations of the preferred embodiments of the present invention will be explained in detail with reference to the accompanying drawing.

Figure 3:
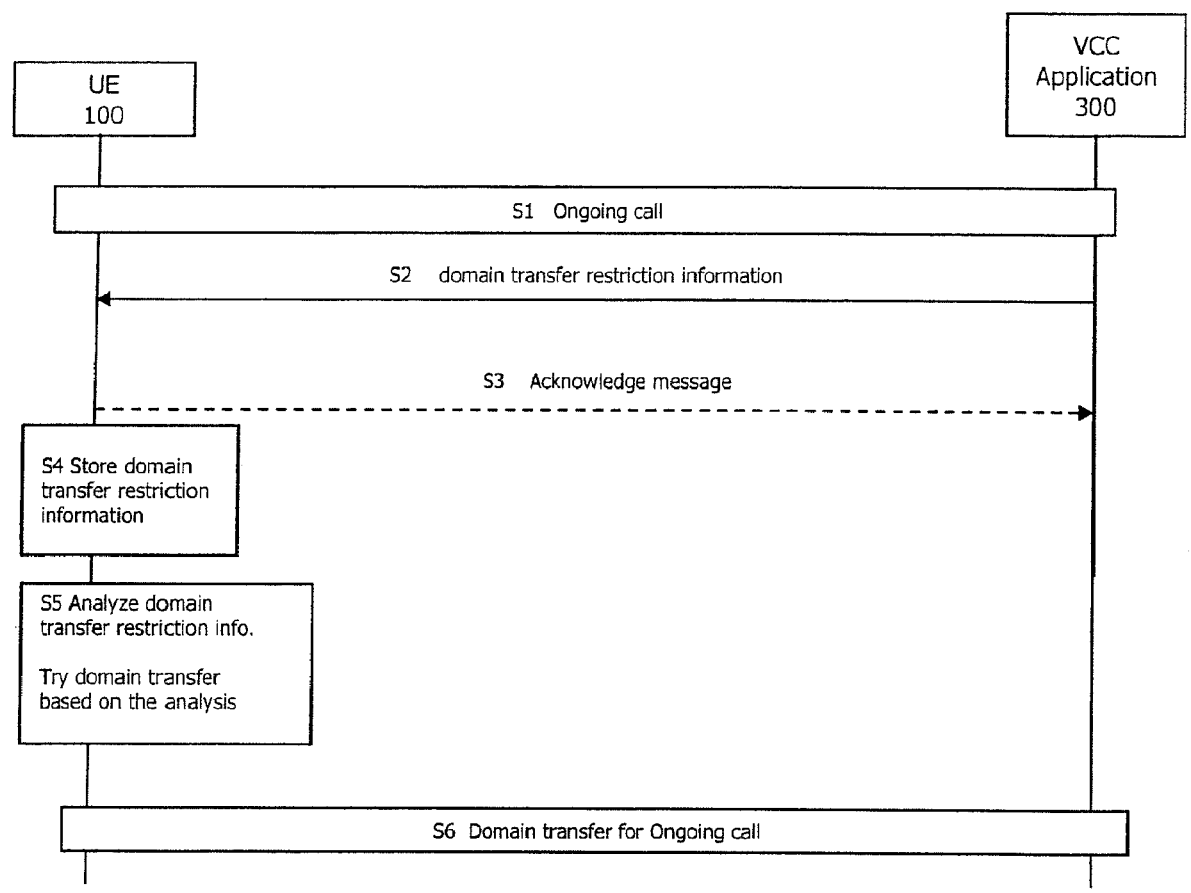
FIG. 3 is a signal flowchart illustrating a method of transmitting domain transfer restriction information to restrict a domain transfer between a UE and a VCC application in accordance with an embodiment of the present invention.

FIG. 3 is a signal flowchart illustrating a method of transmitting domain transfer restriction information to restrict a domain transfer between a UE 100 and a VCC application 300 in accordance with an embodiment of the present invention. This method can he implemented in the network architecture of FIG. 1 or in other suitable architecture. For instance, the UE 100 and the VCC application 300 of FIG. 3 can be respectively the UE 10 and the VCC application 30 of FIG. 1.

Referring to FIG. 3, a call is established between the UE 100 and the VCC application 300, in a CS domain or in an IMS domain therebetween, and the call is ongoing (S1). This call can be an outgoing call originated by the UE 100 or an incoming call directed to the UE 100 by the network. For the ongoing call between the UE 100 and the VCC application 300, when any change in operator policy related to a domain transfer or a change in subscriber information occurs due to a problem caused by the change in the network state or the network management, or there is any other reason or cause for the network to restrict the domain transfer for the ongoing call, the VCC application 300 sends information related to a restriction of the domain transfer (also referred to as 'domain transfer restriction information' hereafter) to the UE 100 (S2).

Figure 1:
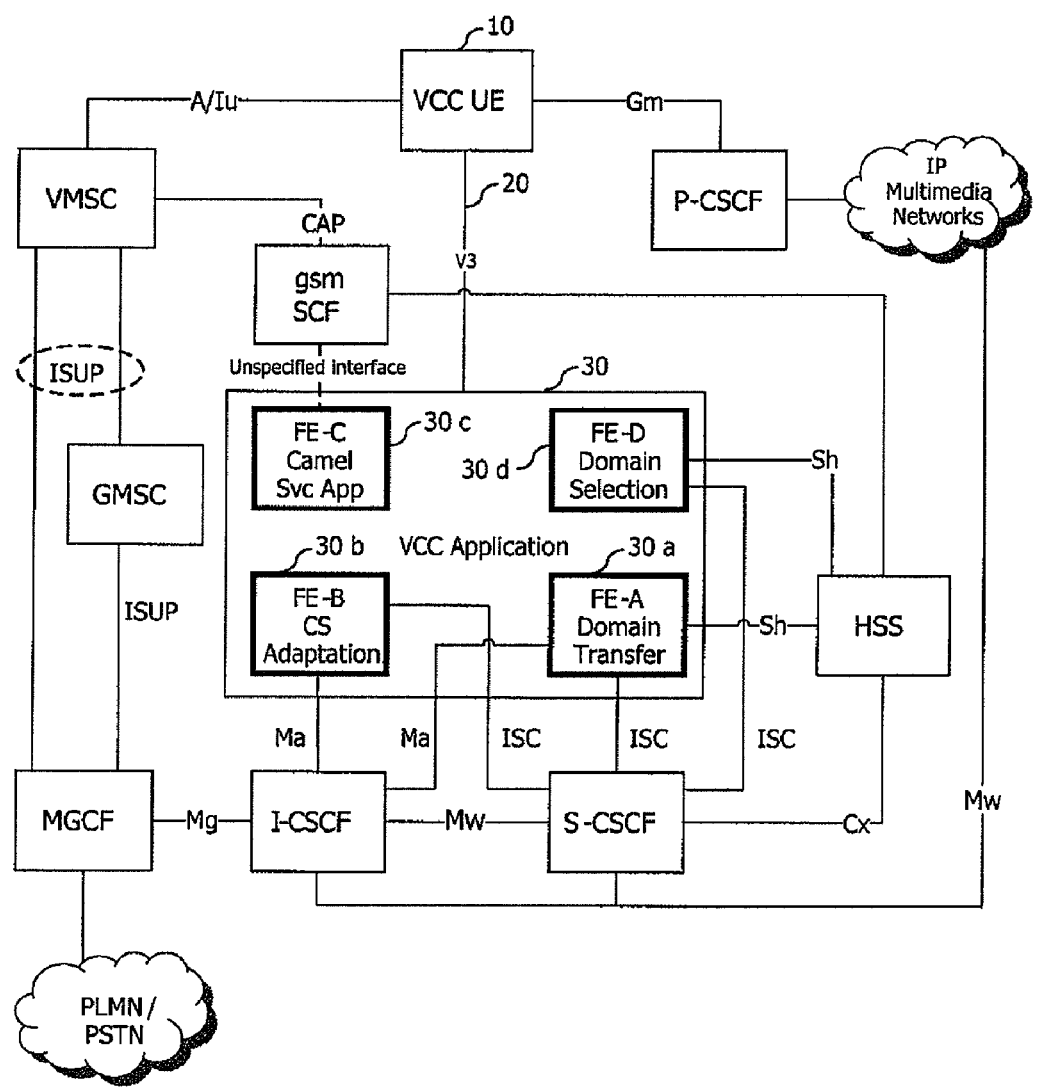
FIG. 1 is a view illustrating an architecture of a network for providing a VCC service, in which the present invention can be implemented.
Figure 2:
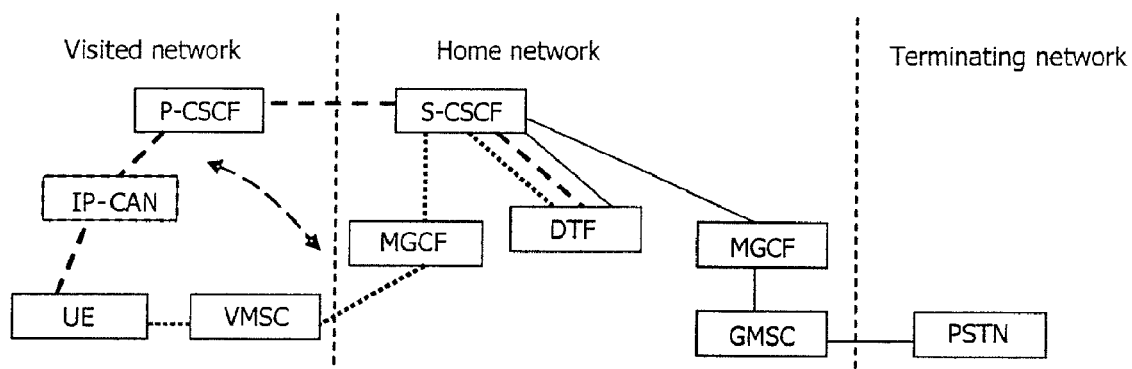
FIG. 2 is a signal flowchart among certain components of a network in a case where a domain transfer is performed between an IMS domain and a CS domain according to a background art.

According to one example, in step S2 the domain transfer restriction information can be included in operator policy sent from the VCC application 300 to the UE 100, e.g., via a V3 interface (e.g., 20 in FIG. 1). That is, the operator policy, sent from the VCC application 300 to the UE 100, can include the domain transfer restriction information and other information such as domain selection information indicating a domain to be selected, domain transfer request information requesting a domain transfer, etc. According to another example, in step S2 the domain transfer restriction information can alone be sent from the VCC application 300 to the UE 100, e.g., via the V3 interface. Then the UE 100 can store the received domain transfer restriction information as part of operator policy stored in the UE 100. According to these examples, in step S2, it can be said a message/signal is sent from the VCC application 300 to the UE 100, where this message can be (a) a message carrying operator policy including the domain transfer restriction information, or (b) a message only carrying the domain transfer restriction information (without operator policy).Then the UE 100 receives the domain transfer restriction information (message) from the VCC application 300, and sends a response message (e.g., Ack message) to the VCC application 300 in response to the received information (S3). The UE 100 then stores the received domain transfer restriction information in a certain memory provided therein (S4). For instance, the domain transfer restriction information may be stored in a storage unit within the UE 100 or in an independent or separate medium (or means) such as a SIM card, other than in the UE. In step S4, if the operator policy including the domain transfer restriction information therein is received from the VCC application 300, then the UE 100 stores the received operator policy including the domain transfer restriction information (or updates previously stored operator policy with the received information). However, if only the domain transfer restriction information is received from the VCC application 300, then the UE 100 stores the received domain transfer restriction information (or updates previously stored domain transfer restriction information with the received information) in step S4.

According to the present invention, step S3 may be performed either before or after step S4. Further, step S3 may be an optional step, which can be omitted. Also, an ongoing call may be established after step S2. That is, the domain transfer restriction information can be sent from the VCC application 300 to the UE 100 (S2) before the call is established or during the ongoing call.

The domain transfer restriction information may include in detail information associated with a domain transfer restriction, for example, a duration for restricting the domain transfer, a level of the restriction, a direction of the domain transfer restriction, and the like. A detailed description of the domain transfer restriction information and the associated information therein according to the present invention will be explained in detail hereafter.

According to a preferred embodiment, the UE shall take into account this domain transfer restriction information before initiating a domain transfer for an ongoing call (e.g., an outgoing call in CS or IMS). For instance, the UE 100 analyzes the domain transfer restriction information, and decides whether the domain transfer for the ongoing call can be initiated by considering the analyzed domain transfer restriction information (S5 and S6). As an example only, assume that the domain transfer restriction information indicates the duration (e.g., the domain transfer shall be restricted from 14 pm to 16 pm) and the direction of the domain transfer restriction (e.g., a domain transfer over the CS domain shall be restricted). Also assume that an ongoing call of the UE is on over the IMS domain. Under these assumptions, the domain transfer for the ongoing call of the UE is restricted during the setup duration, from 14 pm to 16 pm, and furthermore the domain transfer from the IMS domain to the CS domain is restricted. Hence, the UE takes such domain transfer restriction information into account to decide whether or not to initiate the domain transfer for the ongoing call. If the domain transfer restriction information allows the domain transfer, then the UE can initiate the domain transfer of its ongoing call, whereas if the domain transfer restriction information does not allow (restricts) the domain transfer, then the UE can decide not to initiate the domain transfer of its ongoing call.

Hereinafter, the message including the domain transfer restriction information sent from the network (e.g., VCC application) to the UE (e.g., in step S2) will be explained. According to an embodiment, the domain transfer restriction information can be sent from the VCC application to the UE as a message. This message including the domain transfer restriction information can be sent by use of an Open Mobile Alliance (OMA) CP/DM (device management) or any other protocol, for example. This message can be used to upgrade the domain transfer restriction information.

According to an embodiment, the domain transfer restriction information included in this message contains associated information which includes 1) indication information and/or 2) network policy information. The indication information and the network policy information according to an embodiment of the present invention are discussed in more detail as follows.

1) Indication Information

Indication information is related to a restriction of a domain transfer, which includes associated information for the domain transfer restriction. The indication information includes ① range of applicability information, and/or ② level of restriction information and/or ③ direction of applicability information.

① Range of applicability information: this information designates a range for restricting a domain transfer for calls in the network (e.g., VCC application).The range of applicability information can indicate one or more of the following restrictions on domain transfer:

restriction of domain transfer for a specific session/call (e.g., the network cannot support the domain transfer for a specific call so the domain transfer is restricted (not permitted));

restriction of domain transfer for an ongoing session/call (e.g., the network cannot support the domain transfer for an ongoing call so the domain transfer is restricted);

restriction of domain transfer until re-registering from an IMS domain and/or a CS domain;

restriction of domain transfer until power down of the UE (e.g., the domain transfer is restricted until power of the UE is turned off);

restriction of domain transfer based on a time period (e.g., the domain transfer is restricted during a certain time period);and/or restriction of domain transfer until a predefined prohibition is cancelled or released (e.g., if the network imposes a prohibition that no call is to be allowed in a certain area and if the user moves into or is in that area, then the domain transfer on the call is restricted since the prohibition is still imposed).

② Level of restriction information: this is a type of guideline information for designating a level of restriction with respect to the domain transfer restriction, examples of which are as follows:

a first level (so-called 'Shall not' (must not)) used so that the network (i.e., VCC application) can indicate to the UE not to initiate (perform) the domain transfer (e.g., here, any attempt of the UE to initiate the domain transfer will be rejected); or a second level (so-called 'Should not' (preferably not)) used when it is intended to maintain an ongoing call in a specific domain (e.g., this may be available when the UE attempts to initiate a domain transfer). Here, the UE can consider both the domain transfer restriction information, and user preference information which can indicate information pertaining a domain transfer. So based on both information, the UE can decide whether to initiate a domain transfer. Alternatively, the UE can consider only the domain transfer restriction info to determine whether or not to initiate a domain transfer.); or a third level (so-called 'is allowed') used to cancel a previous restriction of domain transfer (e.g., to indicate that a domain transfer can be initiated after notifying the above levels of restriction). Here, the UE can consider both the domain transfer restriction information, and user preference information which can indicate information pertaining a domain transfer. So based on both information, the UE can decide whether to initiate the domain transfer. Alternatively, the UE can consider only the domain transfer restriction information.

These levels (e.g., the first to third levels) can be represented by different values of a parameter for indicating the levels of the domain transfer restriction, by using different parameters corresponding to different levels, or by using other ways. Each of the restrictions listed above, which can be indicated by the range of applicability information can have the first, second or third level discussed above.

③ Direction of applicability information: this is information for indicating that an initiation of domain transfer is applicable only in a certain direction. The direction of applicability information can indicate one of the following:

Inapplicable in both directions (e.g., from the IMS to CS, and from the CS to IMS);

Inapplicable in an IMS domain; or

Inapplicable in a CS domain.

For instance, if the direction of applicability information indicates "inapplicable in an IMS domain", then the domain transfer for an ongoing call is inapplicable (not applicable or allowed) in the IMS domain.

2) Network Policy Information

The network policy information is information for indicating conditions with respect to the restriction of domain transfer based upon operator policy. Namely, it is information for indicating that a network indicates the restriction of domain transfer when a call corresponding to a certain condition or a specific situation takes place from the UE. Examples of the network policy information are as follows:

information for indicating not to initiate a domain transfer when placing a multiparty call or multi-session call;

information for indicating not to initiate a domain transfer when a cell ID is a specific ID;

information for indicating not to initiate a domain transfer in case of an off-state of a function at a side of a Wireless Local Area Network (WLAN);

information for indicating not to initiate a domain transfer in case of a certain supplementary service (e.g., call hold, call waiting, etc.); and/or information for indicating not to initiate a domain transfer in case of an emergency call.

As aforementioned, the domain transfer restriction information (e.g., the indication information and/or network policy information) is sent from the VCC application to the UE by being included in a message, e.g., in a format of parameter (or element). The VCC application can combines one or more associated information to generate the domain transfer restriction information to be sent to the UE. For example, if intended to always restrict a domain transfer of the UE toward an IMS domain, the VCC application sends to the UE the corresponding indication information by including it in the message. In another example, when the UE does not support a domain transfer for ongoing calls (i.e., a type of indication information), and does not (or should not) initiate the domain transfer even if a multiparty call is placed (i.e., a type of network policy information), the VCC application includes the corresponding indication information and network policy information in the message to be sent to the UE.

Hereinafter, constructions and operations of the UE 100 and VCC application 300 according to an embodiment of the present invention will be explained.

The UE 100 according to the present invention may comprise a basic hardware construction to generate and process domain transfer restriction information.

Figure 4:
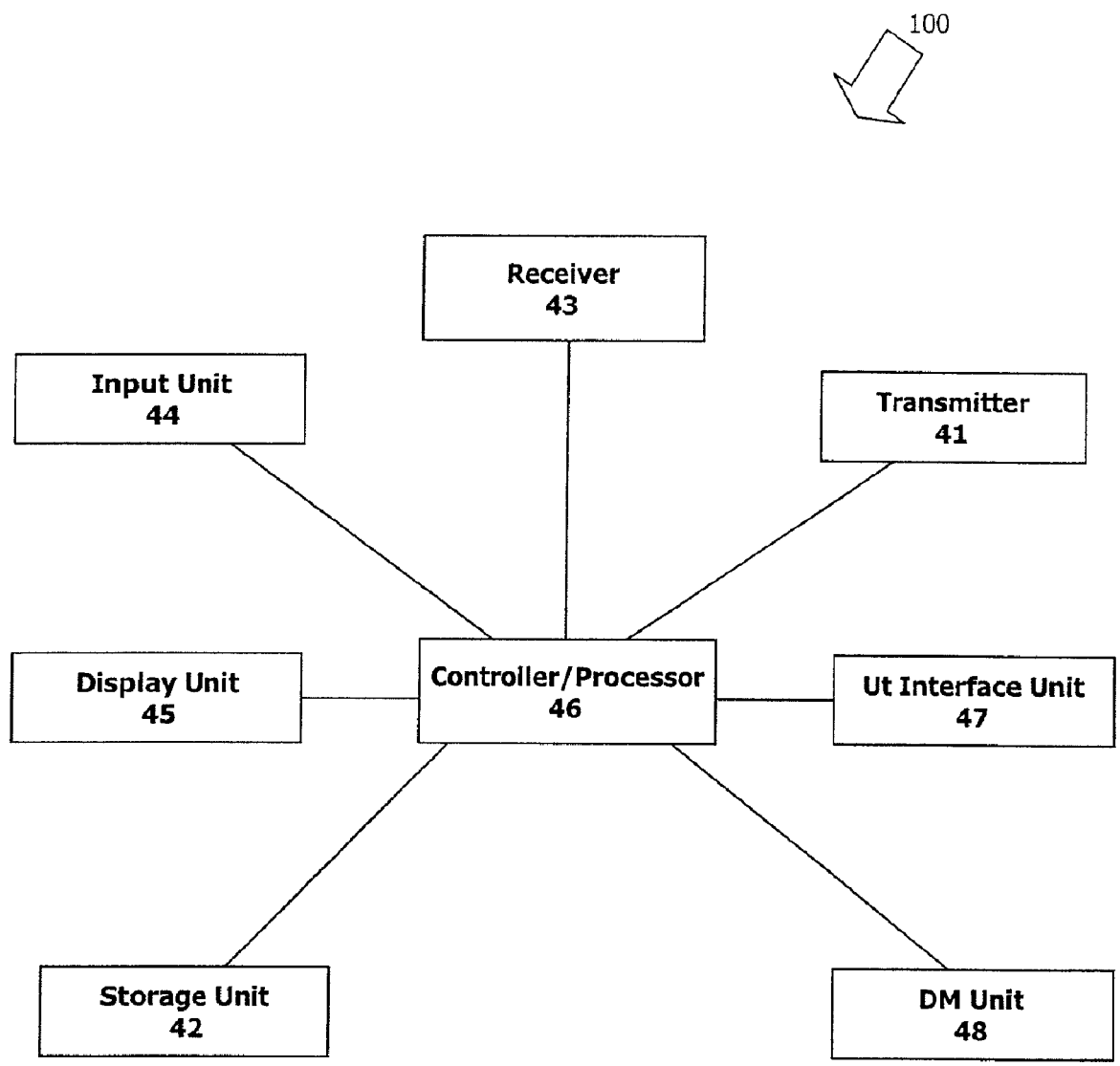
FIG. 4 is a block diagram of a terminal or UE according to an embodiment of the present invention.

For instance, as shown in FIG. 4, the UE 100 according to an embodiment of the present invention may comprise a receiver 43 for receiving domain transfer restriction information from the VCC application 300, a transmitter 41 for transmitting an Ack message in response to the received domain transfer restriction information, a memory or storage unit 42 for storing the received domain transfer restriction information and other information such as operator policy, user preferences, etc. and a VCC enabler (controller) 46 for analyzing the domain transfer restriction information, deciding whether a domain transfer for an ongoing call can or should be initiated and then attempting the domain transfer according to the decision. Here, the VCC enabler may be a controller as a type of controlling unit for analyzing the domain transfer restriction information in order to decide on whether or not to initiate the domain transfer. The UE 100 may also include other components such as a Ut interface unit 47, a DM unit 48, an input unit 44, and a display unit 45. All components of the UE 100 are operatively coupled.

Thus, the operation and function of each component of the UE which includes technical features of the present invention have been explained. Besides, other basic components of the UE for receiving a VCC service are obvious to those skilled in the art, and the discussion thereof is thus omitted.

The VCC application 300 according to an embodiment of the present invention may comprise a message generator for generating a message including domain transfer restriction information in response to a change in a network state or operator policy with respect to the domain transfer for the network maintenance, a transmitter for transmitting the generated message to the UE, and a receiver for receiving an Ack message sent by the UE in response to the message including the domain transfer restriction information. Here, the message generator may be a type of controller because it generates the message for the purpose of restricting the domain transfer.

The present invention has been explained with reference to embodiments illustrated in the drawings, which, however, are just exemplary. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

As described above, the present invention is effective for the UE to recognize a network state for domain transfer based upon domain transfer restriction information. That is, when a domain transfer for a call is restricted due to a change in operator policy or for some other reason/cause, a network in the VCC (i.e., VCC application) can send to the VCC UE the domain transfer restriction information, so that the UE can be aware of the network state and/or the domain transfer restriction information.

Also, in the present invention, from the UE (i.e., terminal) perspective, since the UE can attempt to initiate the domain transfer by taking a current network state into account (based on the domain transfer restriction information), it is effective to prevent unnecessary attempts or initiations of domain transfer by the VCC UE.

In addition, the present invention can prevent consumption of signaling and radio resources due to unnecessarily initiated domain transfers, which prevents wasting of the UE battery and CPU power due to unnecessary signaling.

The invention claimed is:

1. A method for controlling a voice call continuity (VCC) operation between a mobile terminal and a network, the method comprising:

receiving operator policy via an OMA Device Management (DM) method during at least one call or session established between the mobile terminal and the network, the operator policy including domain transfer restriction information;

evaluating the domain transfer restriction information of the operator policy; and selectively initiating a domain transfer according to the evaluated domain transfer restriction information of the operator policy, wherein the domain transfer restriction information includes a first parameter or element indicating that a domain transfer from a CS domain to an IMS domain is restricted or not and a second parameter or element indicating that a domain transfer from the IMS domain to the CS domain is restricted or not.

2. The method of claim 1, wherein the receiving of operator policy via the OMA DM method is achieved by receiving a message or signal from the network.

3. The method of claim 1, wherein the call or session is an ongoing call or ongoing session.

4. The method of claim 3, wherein the ongoing call or session is an incoming call or session, or an outgoing call or session.

5. The method of claim 1, wherein the receiving step is performed before or after the call or session is established.

6. A mobile terminal for controlling a voice call continuity (VCC) operation with a network, the mobile terminal comprising:

a receiver to receive operator policy via an OMA Device Management (DM) method during at least one call or session established between the mobile terminal and the network, the operator policy including domain transfer restriction information; and a controller to evaluate the domain transfer restriction information of the operator policy, and to selectively initiate a domain transfer according to the evaluated domain transfer restriction information of the operator policy, wherein the domain transfer restriction information includes a first parameter or element indicating that a domain transfer from a CS domain to an IMS domain is restricted or not and a second parameter or element indicating that a domain transfer from the IMS domain to the CS domain is restricted or not.

7. The mobile terminal of claim 6, wherein the receiver receives the operator policy via the OMA DM method by receiving a message or signal from the network.

8. The mobile terminal of claim 6, wherein the call or session is an ongoing call or ongoing session.

9. The mobile terminal of claim 8, wherein the ongoing call or session is an incoming call or session, or an outgoing call or session.

10. The mobile terminal of claim 6, wherein the receiving step is performed by the receiver before or after the call or session is established.

* * * * *